US012744032B2

(12) United States Patent
White, Jr. et al.

(10) Patent No.: US 12,744,032 B2
(45) Date of Patent: Sep. 22, 2026

(54) SYNTHETIC VIDEO MODEL FOR INSTRUCTING A USER TO IMPROVE SPEECH

(71) Applicant: Cisco Technology, Inc., San Jose, CA (US)

(72) Inventors: David C. White, Jr., St. Petersburg, FL (US); Jay K. Johnston, Raleigh, NC (US); Magnus Mortensen, Cary, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 566 days.

(21) Appl. No.: 17/977,353

(22) Filed: Oct. 31, 2022

(65) Prior Publication Data

US 2024/0144918 A1 May 2, 2024

(51) Int. Cl.
*G10L 15/18* (2013.01)
*G10L 15/07* (2013.01)

(52) U.S. Cl.
CPC .............. *G10L 15/18* (2013.01); *G10L 15/07* (2013.01)

(58) Field of Classification Search
CPC .......... G10L 15/18; G10L 15/07; G10L 21/10
See application file for complete search history.

(56) References Cited

U.S. PATENT DOCUMENTS 10,915,740 B2 * 2/2021 Sipolins ............... G06V 40/174
2019/0333021 A1 * 10/2019 Steinhoff ................ G10L 15/08
2020/0294421 A1 9/2020 Stevens
2023/0290332 A1 * 9/2023 Jawahar ................ G10L 13/027

FOREIGN PATENT DOCUMENTS

CN 102663928 A 9/2012
CN 106157750 A 11/2016
CN 112927712 A * 6/2021 ............. G10L 15/02
WO WO-2023007509 A1 * 2/2023 ........... G06V 40/168

OTHER PUBLICATIONS

Thies et al., "Face2Face: Real-time Face Capture and Reenactment of RGB Videos," Computer Vision Foundation, Cited portions of prior art (Year: 2020).*
Resmi, K. et al., "Graphical Speech Training System for Hearing Impaired," 2011 International Conference on Image Information Processing (ICIIP 2011), retrieved Jul. 20, 2022, 6 pages.

(Continued)

*Primary Examiner* — Hai Phan
*Assistant Examiner* — Ian Scott McLean
(74) *Attorney, Agent, or Firm* — Edell, Shapiro & Finnan, LLC

(57) ABSTRACT

A method, computer system, and computer program product are provided for improving user speech. A data sample of a user speaking one or more words is received, wherein the data sample includes video data and audio data of the user speaking. The data sample is analyzed to determine a correct articulation of a mouth when speaking the one or more words. A synthetic video of the user performing the correct articulation is generated. The synthetic video of the user is presented to the user. A live video of the user is presented to the user while the synthetic video is presented.

20 Claims, 9 Drawing Sheets

(56) References Cited

OTHER PUBLICATIONS

Ming-Liang Hsiao, P. et al., "A Computer Based Software for Hearing Impaired Children's Speech Training and Learning Between Teacher and Parents in Taiwan," Institute of Biomedical Engineering, National Yang-Ming University, Taiwan, Oct. 25, 2001, 4 pages.

Sign Translate, "Sign language translator app for desktop and mobile," https://sign.mt/, Oct. 12, 2022, 1 page.

European Comission, Prosperity4all, "Sign-Language-and-Static-gesture-recognition-using-sklearn," https://developerspace.gpii.net/develop/components/sign-language-and-static-gesture-recognition-using-sklearn, GPII DeveloperSpace, retrieved Oct. 26, 2022, 4 pages.

Speechreading, "Supporting Success for Children With Hearing Loss," https://successforkidswithhearingloss.com/speechreading/, retrieved Oct. 26, 2022, 9 pages.

* cited by examiner

SYNTHETIC VIDEO MODEL FOR INSTRUCTING A USER TO IMPROVE SPEECH

TECHNICAL FIELD

The present disclosure relates to a synthetic video model that provides feedback to a user to improve the user's speech.

BACKGROUND

In the field of providing treatment for hearing impairment, there have been many technological advances that enable deaf or hard-of-hearing users to better communicate with others. For example, software applications can translate speech into text, enabling hearing-impaired users to participate in a conversation by reading what the other participants have spoken. Additionally, there are software applications that can interpret sign language, translating signed words or phrases into their corresponding text or even speech. However, conventional approaches do not teach hearing-impaired users how to improve their speech.

DETAILED DESCRIPTION

Overview

Figure 1:
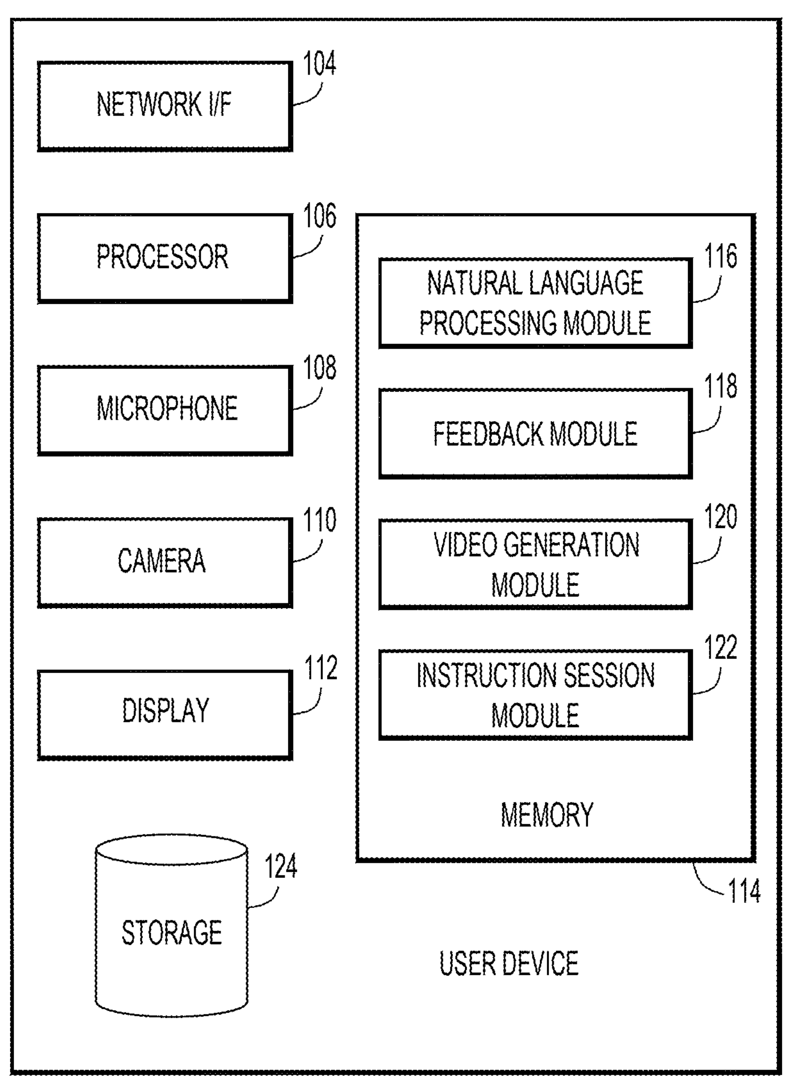
FIG. 1 is a block diagram of a computing system that uses a synthetic video model to instruct users to improve speech, according to an example embodiment.

According to one embodiment, techniques are provided for improving user speech. A data sample of a user speaking one or more words is received, wherein the data sample includes video data and audio data of the user speaking. The data sample is analyzed to determine a correct articulation of a mouth when speaking the one or more words. A synthetic video of the user is generated performing the correct articulation. The synthetic video of the user is presented to the user. A live video of the user is presented to the user while the synthetic video is presented.

EXAMPLE EMBODIMENTS

In the field of audiology, researchers seek to provide effective treatments to hearing-impaired persons. In order to improve a hearing-impaired individual's ability to communicate with others, there are a variety of options, such as sign language, written or typed forms of communications, mouth-reading, and other visual-based manners of communicating. Many hearing-impaired individuals possess the ability to speak, but as these individuals typically cannot hear themselves talk, learning or improving speech can be difficult. Hearing-abled humans are taught to speak by listening to others pronounce sounds and repeating the sounds back; this repetition invokes a motor memory that enables instant corrections to mispronounced words. In contrast, this feedback loop is unavailable to hearing-impaired individuals.

Accordingly, presented herein are techniques for training hearing-impaired individuals to speak using visual guidance and/or other feedback. By presenting a visualization of a mouth that is making the correct articulations, a user can visually learn how to make those same articulations. In particular, a visualization of a mouth and/or other facial features can be superimposed over imagery of a user, enabling the user to compare the user's own articulations to the correct articulations for speech. A synthetic visualization of a mouth and/or other facial features that mimic the user's own appearance (e.g., a "deepfake") can be generated, thereby providing highly-realistic examples of correct speech to the user. Additionally or alternatively, other feedback can be provided to a user, such as instructions to adjust the user's tone, volume, and/or cadence of speech.

Thus, present embodiments improve the field of audiology by enabling a hearing-impaired user to improve his or her speech even in the case that the user cannot actually hear his or her speech. Present embodiments provide several practical applications, including teaching a mute user to speak, improving the speech of a hearing-impaired user, and even teaching users to pronounce words in other languages. Moreover, present embodiments may include a machine learning model that is updated based on the outcomes of users, thereby improving the accuracy of the model (e.g., causing the model to more accurately recommend particular modifications to a user's speech that are helpful).

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram of a computing system 100, according to an example embodiment. As depicted, computing system 100 includes a network interface (UF) 104, at least one at least one processor 106, a microphone 108, a camera 110, a display 112, memory 114, and storage 124. Memory 114 stores software instructions for a natural language processing module 116, a feedback module 118, a video generation module 120, and an instruction session module 122. It is to be understood that the functional division among components of computing system 100 has been chosen for purposes of explaining various embodiments and is not to be construed as a limiting example. Computing system 100 may include internal and external hardware components, as depicted and described in further detail with respect to FIG. 8. In general, computing system 100 enables a user to participate in instruction sessions in which the user's speech is processed to provide visual and/or text-based feedback to the user in order to improve the user's speech.

In various embodiments, computing system 100 may include a rack-mounted server, laptop, desktop, smartphone, tablet, or any other programmable electronic device capable of executing computer readable program instructions. Network interface 104 enables components of computing system 100 to send and receive data over a network. Microphone 108 may include any audio-recording device (e.g., a transducer that converts sounds into signals), and may be positioned at a location that is suitable to obtain audio samples from the user. Likewise, camera 110 may include any video-recording device (e.g., a transducer that converts images into signals), and may also be positioned at a location that is suitable to obtain video samples from a user when the user is speaking.

Display 112 may include any electronic device capable of presenting information in a visual form. For example, display 112 may be a liquid crystal display (LCD), a cathode ray tube (CRT) display, a light-emitting diode (LED) display, an electronic ink display, and the like. In one example embodiment, microphone 108 and camera 110 may be positioned with respect to display 112 such that microphone 108 and camera 110 may capture audio and video data, respectively, of a user while the user is viewing display 112. For example, camera 110 may be a webcam mounted over display 112, and microphone 108 may be integrated into the webcam. In another embodiment, display 112 may include a virtual reality or augmented reality display.

Natural language processing module 116, feedback module 118, video generation module 120, and instruction session module 122 may include one or more modules or units to perform various functions of the embodiments described below. Natural language processing module 116, feedback module 118, video generation module 120, and instruction session module 122 may be implemented by any combination of any quantity of software and/or hardware modules or units, and may reside within memory 114 of computing system 100 for execution by a processor, such as processor 106.

Natural language processing module 116 processes language inputs in order to identify phonemes for use in improving a user's speech. A phoneme is a unit of sound that can distinguish one word from another in a particular language. In various embodiments, the language inputs may be textual inputs or audio inputs. For example, a user may input text that includes a language sample, or a user may speak into a microphone (e.g., microphone 108) to provide a language sample. In some embodiments, natural language processing module 116 may identify the phonemes that correspond to the language sample based on predetermined associations between words and phonemes. In particular, a corpus of words may be provided that are each associated with the phonemes that compose the word, including the order of the phonemes. For example, the word "clock" may be associated with the ordered phonemes of "/k/ /l/ /o/ /k/" (a four-phoneme word), and the word "blue" may be associated with the ordered phonemes of "/b/ /l/ /oo/" (a three-phoneme word). In some embodiments, natural language processing module 116 utilizes a trained machine learning model to convert audio inputs into text, which may be processed further.

Natural language processing module 116 may include one or more machine learning models for processing inputs in accordance with present embodiments. In particular, natural language processing module 116 may include a machine learning model that is trained to perform phoneme segmentation (i.e., converting input words into constituent ordered phonemes). The machine learning model may be trained using a sample training set that includes examples of words and their constituent ordered phonemes. Thus, the machine learning model can learn to perform phoneme segmentation on words that are not predefined in a corpus.

In some embodiments, natural language processing module 116 analyzes audio input provided by a user to identify tone, volume, and/or cadence parameters of the user's speech. These parameters may be compared to predefined baseline parameters, which may be specific for each given word, in order to identify any deviations from a baseline. If a tone, volume, and/or cadence parameter differs from a baseline value by a threshold value, then a user can be provided with corrective feedback.

Feedback module 118 may generate responses, based on user input, which are selected to improve the user's speech. In some embodiments, feedback module 118 determines articulations for a user's mouth based on an input set of one or more phonemes. The articulations may be predefined for each possible phoneme, and may include particular mouth shapes and tongue positions that are achieved during human speech. Each articulation may be stored as a two-dimensional or three-dimensional representation of a human mouth. In some embodiments, each articulation is stored as a two-dimensional or three-dimensional model, such as a wireframe model, which can be combined with a texture to generate a synthetic appearance of a person's mouth and/or face producing the articulation. Thus, a synthetic image or video can be generated of any person (e.g., the user) making any articulation for any word.

Additionally or alternatively, feedback module 118 may generate feedback that includes text-based feedback, such as adjustments to the mouth during pronunciation of a word. In the case of either synthetic video feedback or text-based feedback, the instructions to correct speech can be determined using a trained machine learning model using examples of instructions and corresponding samples of incorrect articulations. Thus, feedback module 118 can be trained to give corrective feedback to any user, despite feedback module 118 not being provided with examples of that particular user's mouth articulations.

In some embodiments, feedback module 118 generates feedback that relates to the tone, volume, and/or cadence of a user's speech. Feedback can be determined based on a set of conditional rules that are applied to the detected tone, volume, and/or cadence of a user's speech. When a tone, volume, or cadence parameter violates a defined threshold value, then feedback module 118 may select feedback that suggests behavior for a user's speech to return to within the defined threshold value. For example, if a user is talking too quickly, a cadence parameter threshold may be violated, and feedback module 118 may provide feedback indicating that the user should speak more slowly.

Video generation module 120 may generate video that includes a synthetic appearance of an individual (e.g., a generic or default person, a specific person, such as the user, etc.) performing particular speech articulations based on the received speech input. In some embodiments, video generation module 120 generates a realistic video depicting a user speaking one or more input words. Video generation module 120 may generate videos in real-time as a user is speaking, such that there is substantially little delay between the input word being provided and the appearance of the user speaking the word.

Video generation module 120 may create videos of a user by combining one or more images of the user with one or more two-dimensional and/or three-dimensional models to generate a synthetic image of the user making the articulations associated with the input model(s). Video generation module 120 may employ one or more machine learning models in order to generate synthetic videos. In various embodiments, video generation module 120 may use an autoencoder, a generative adversarial network, or other suitable machine learning model to generate the synthetic videos. The model can be trained using training data that includes sample images of a person, which are used to generate synthetic images; the synthetic images can be compared to a testing set that includes other sample images of the same person to enable the model to be trained until the generated synthetic images are within a threshold level of likeness to the images in the testing set.

In some embodiments, video generation module 120 processes image data of a user (e.g., data acquired by camera 110) by combining, in real-time, the image data with the synthetic data so that a user can simultaneously view both the user's current appearance and the synthetic video. The user's current appearance and the synthetic video can be superimposed and aligned, and one of the layers may be transparent, enabling the user to see the user's current mouth articulation and the correct articulation. Thus, the user can manipulate the user's mouth in real-time so that the user's mouth articulation aligns with the correct articulation, enabling the user to learn how to speak sample words. In some embodiments, the live video of the user is provided to a transparent layer that superimposes another layer containing the synthetic video.

Instruction session module 122 generates instruction sessions for a user by monitoring a user's progress and providing particular sample words to the user during a session. Instruction session module 122 may follow a predefined lesson plan that includes a sequence of sample words. Depending on the user's progress, instruction session module 122 may progress through the sequence. A user's progress can be tracked by various factors, such as user input, input by another (e.g., an audiologist), or automatically based on how much time a user requires in order to align the user's articulation with the correct articulation.

Storage 124 may include any non-volatile storage media known in the art. For example, storage 124 can be implemented with a tape library, optical library, one or more independent hard disk drives, or multiple hard disk drives in a redundant array of independent disks (RAID). Similarly, data in storage 124 may conform to any suitable storage architecture known in the art, such as a file, a relational database, an object-oriented database, and/or one or more tables. Storage 124 may store data including captured user image data, generated synthetic image data, models of articulations and associated phonemes, trained machine learning models, trained natural language processing models, lesson plan word sequences, and the like.

Figure 2:
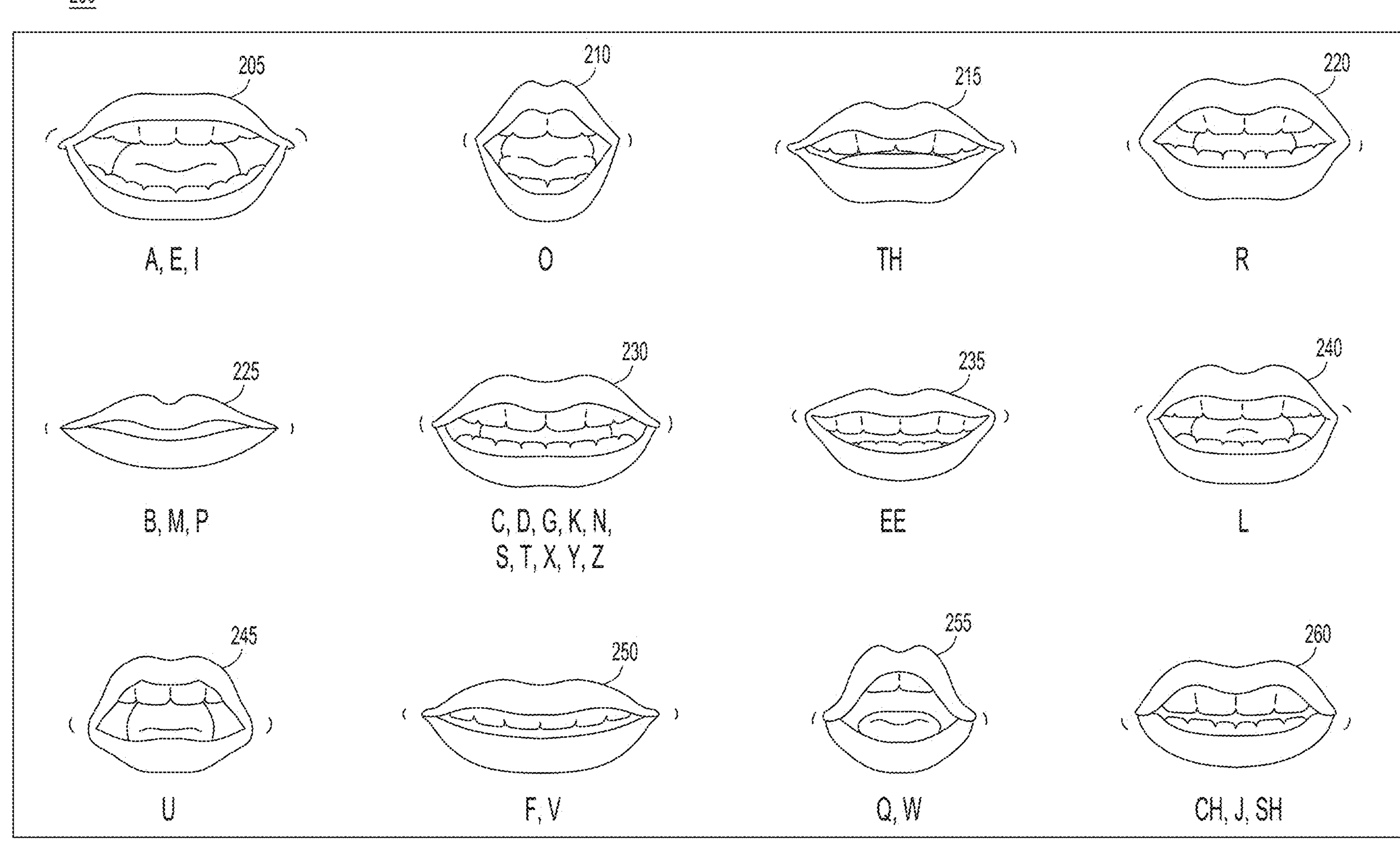
FIG. 2 is a diagram depicting articulations for various phonemes for use in instructing users to improve speech, according to an example embodiment.

Reference is now made to FIG. 2. FIG. 2 is a diagram depicting articulations 200 for various phonemes, according to an example embodiment. As depicted, different phonemes, or phoneme groups, may be associated with particular articulations, which can be mapped to specific models for use when videos are synthesized in accordance with present embodiments. In the depicted embodiment, the /a/, /e/, and /i/ phonemes are mapped to articulation 205, the /o/ phoneme is mapped to articulation 210, the /th/ phoneme is mapped to articulation 215, the /r/ phoneme is mapped to articulation 220, the /b/, /m/, and /p/ phonemes are mapped to articulation 225, the /c/, /d/, /g/, /k/, /n/, /s/, /t/, /x/, /y/, and /z/ phonemes are mapped to articulation 230, the /ee/ phoneme is mapped to articulation 235, the /l/ phoneme is mapped to articulation 240, the /u/ phoneme is mapped to articulation 245, the /f/ and /v/ phonemes are mapped to articulation 250, the /q/ and /w/ phonemes are mapped to articulation 255, and the /ch/, /j/, and /sh/ phonemes are mapped to articulation 260. Thus, a database that links phonemes to articulation models can be used to translate words into correct articulations by performing phoneme segmentation and then processing the resulting phonemes with an image generator (e.g., video generation module 120).

Figure 3:
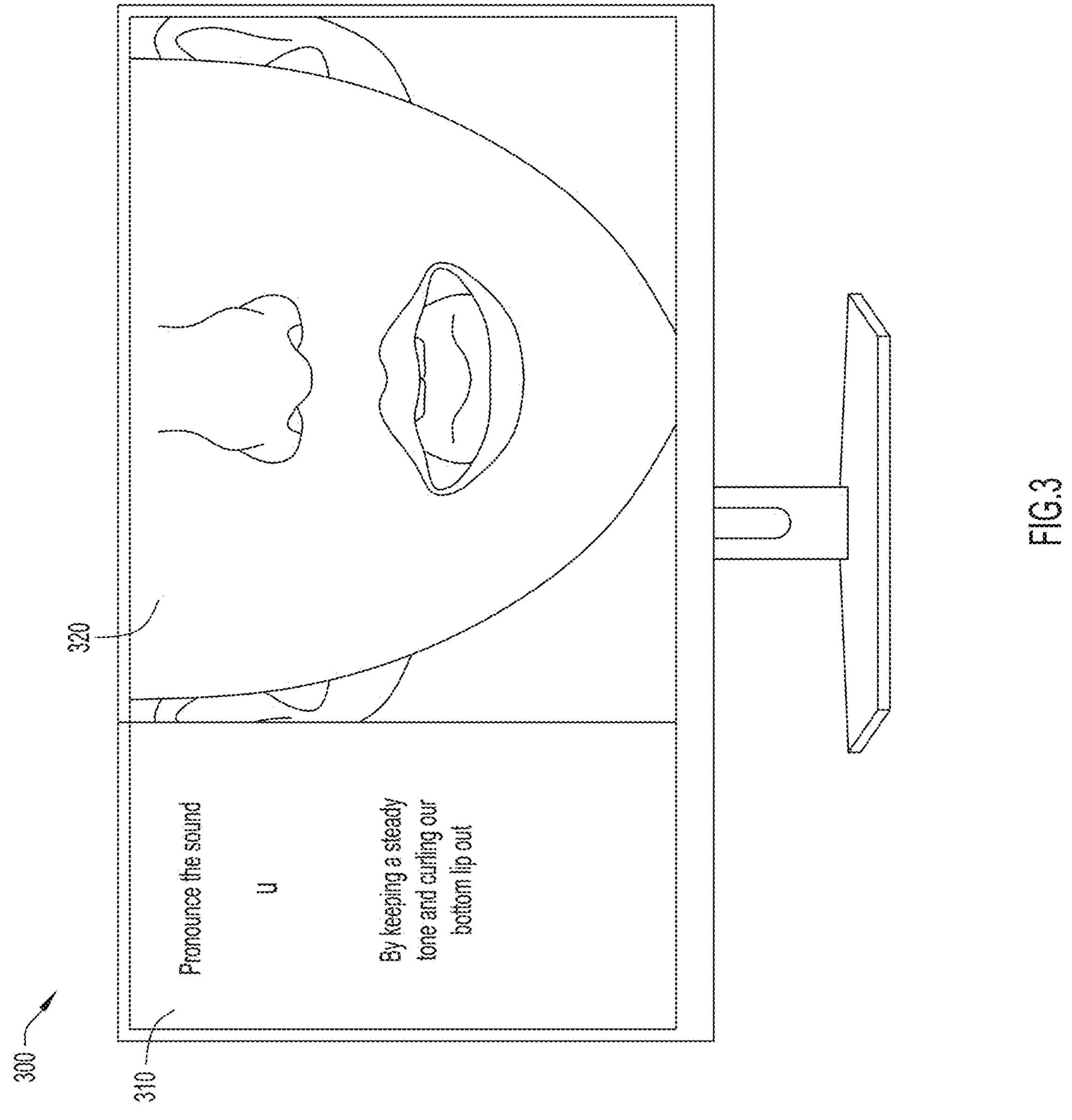
FIG. 3 is an illustration depicting an example of a screen shot of video that provides speech feedback to a user, according to an example embodiment.

FIG. 3 is an illustration depicting a screen shot (snapshot) 300 of a video presented on a display that provides speech feedback to a user, according to an example embodiment. As depicted, there is a first panel or window 310 for displaying text-based feedback for a user, and a second panel or window 320 for displaying articulations to a user. The panels or windows 310 and 320 may present related feedback at the same time; in the depicted example, the text-based feedback in panel or window 310 relates to the articulation shown in panel or window 320. During a session, content of panels or windows 310 and/or 320 may be updated to present different feedback to a user.

Figure 4A:
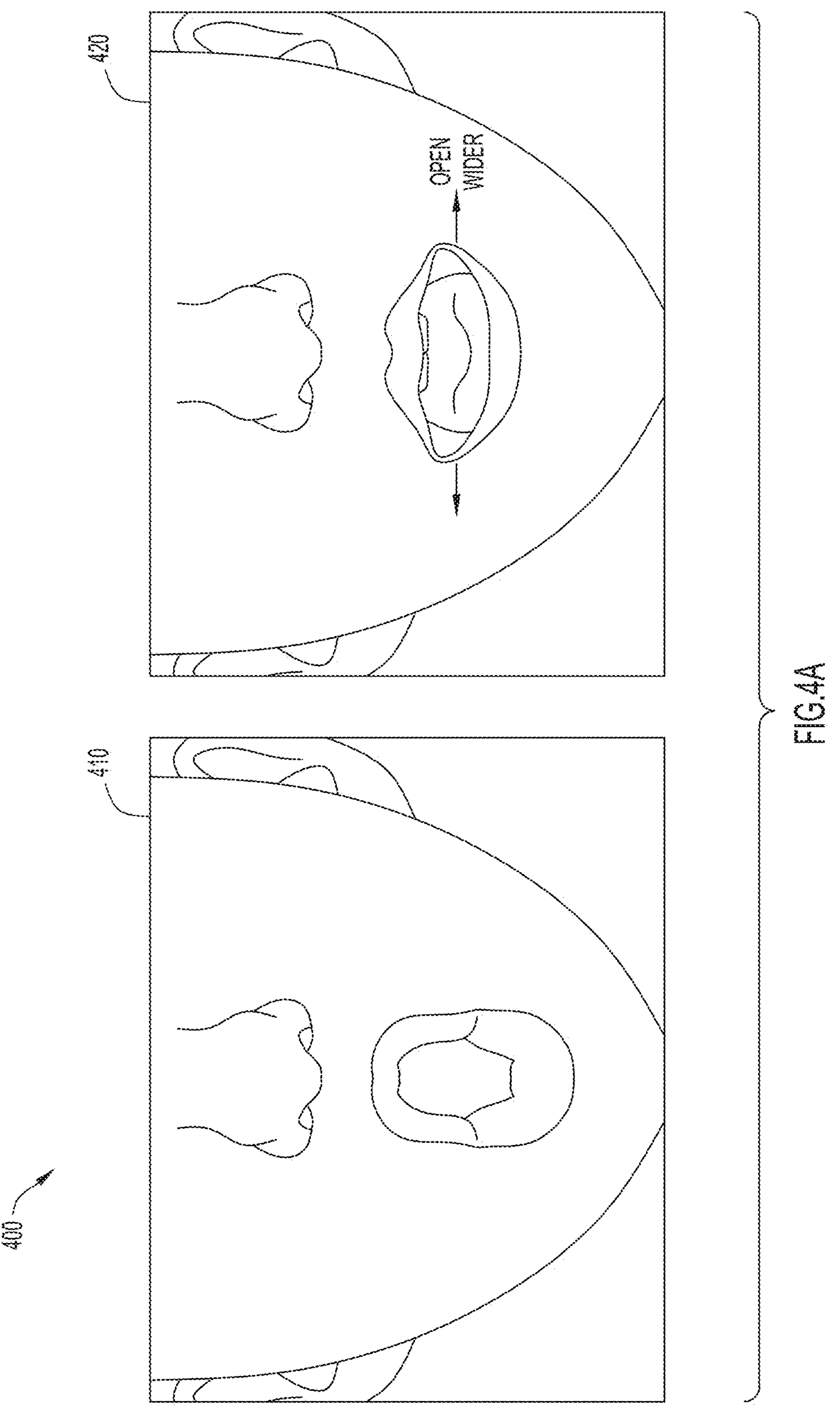
FIG. 4A is an illustration depicting an example of screen shots of synthetic video and live video that are combined to provide speech feedback to a user, according to an example embodiment.

Turning now to FIG. 4A, an illustration is shown depicting screen shots 400 of synthetic and live videos that are combined to provide speech feedback to a user, according to an example embodiment. The screen shots 400 include a screen shot of a live video 410 and a screen shot of a synthetic video 420. In the depicted example, screen shot of live video 410 corresponds to a live video of the user performing a particular articulation during speech. In contrast, screen shot of synthetic video 420 shows a synthetic video that is generated based on the spoken word and includes feedback to teach the user how to make a proper articulation when speaking the word.

Figure 4B:
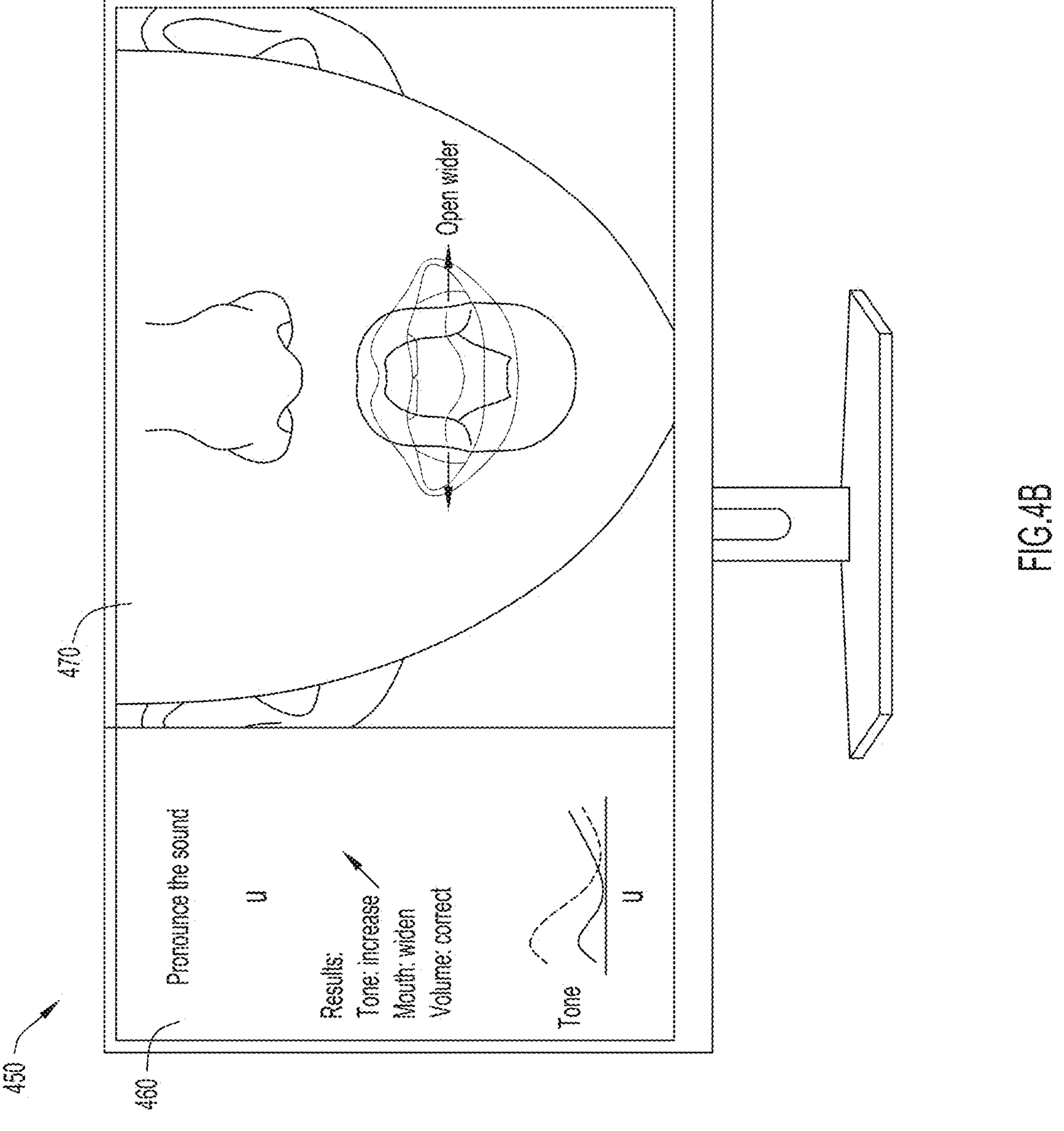
FIG. 4B is an illustration depicting an example of a screen shot of video generated by overlaying synthetic video and live video, according to an example embodiment.

With reference now to FIG. 4B, an illustration is provided depicting an example of a screen shot 450 of video generated by overlaying synthetic and live videos, according to an example embodiment. There is a first panel or window 460 for displaying text-based feedback for a user, and a second panel or window 470 for displaying corresponding articulations to a user. In addition to text, panel or window 460 may display graphs, representations of sound waves, or other visual feedback to prompt a user to improve the user's speech. In the depicted example, the user's tone is being corrected via feedback, which suggests to widen the user's mouth. As shown in second panel or window 470, a visual representation of the user with their current mouth (as captured by a camera, e.g., camera 110) is shown aligned with a synthetic image of a correct articulation. The correct articulation may be transparent to enable the user to see whether the user's mouth matches the correct articulation. The visual representation of panel or window 470 may be generated by overlaying the live video and synthetic video that are depicted and described with reference to screen shots of live video 410 and of synthetic video 420 of FIG. 4A.

Figure 5:
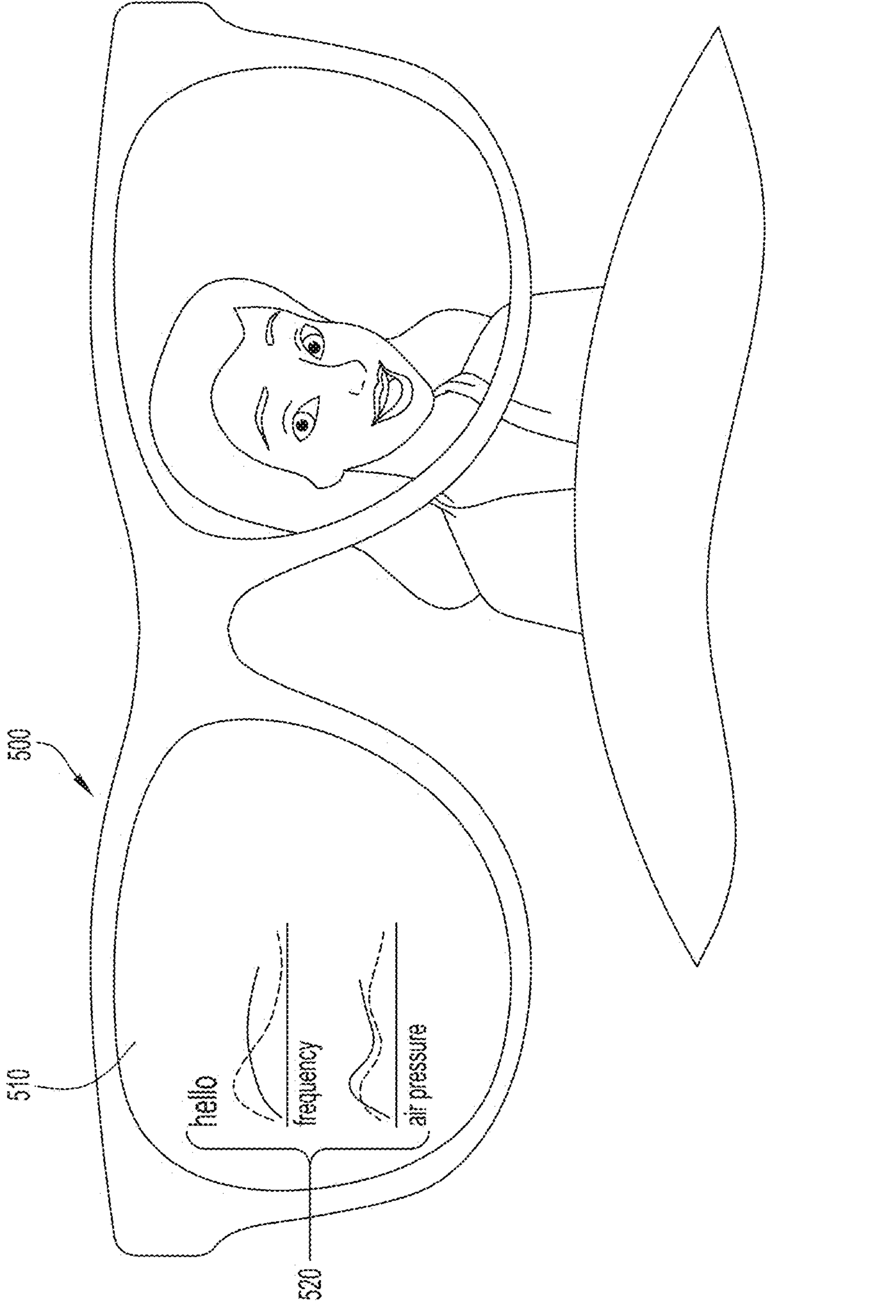
FIG. 5 is an illustration depicting an augmented-reality display that provides speech feedback to a user, according to another example embodiment.

FIG. 5 is an illustration depicting an augmented-reality display 500 (in an eyeglass form factor) that provides speech feedback to a user, according to another example embodiment. As depicted, augmented-reality display 500 includes at least one display 510 that enables light to pass through to be viewed by a user while also displaying a user interface 520, giving the impression that user interface 520 is overlaid with respect to the user's view. Using augmented-reality display 500 in conjunction with the embodiments presented herein enables a user to discreetly correct the user's speech, in real-time, while the user engages in conversation. Augmented-reality display 500 may be paired with one or more computing devices (e.g., computing system 100, depicted and described in further detail with reference to FIG. 1), which may perform processing operations required to support speech feedback. Alternatively, augmented-reality display 500 may include computing components (e.g., processors, memory, storage) integrated into augmented-reality display 500 that can support speech improvement.

Figure 6:
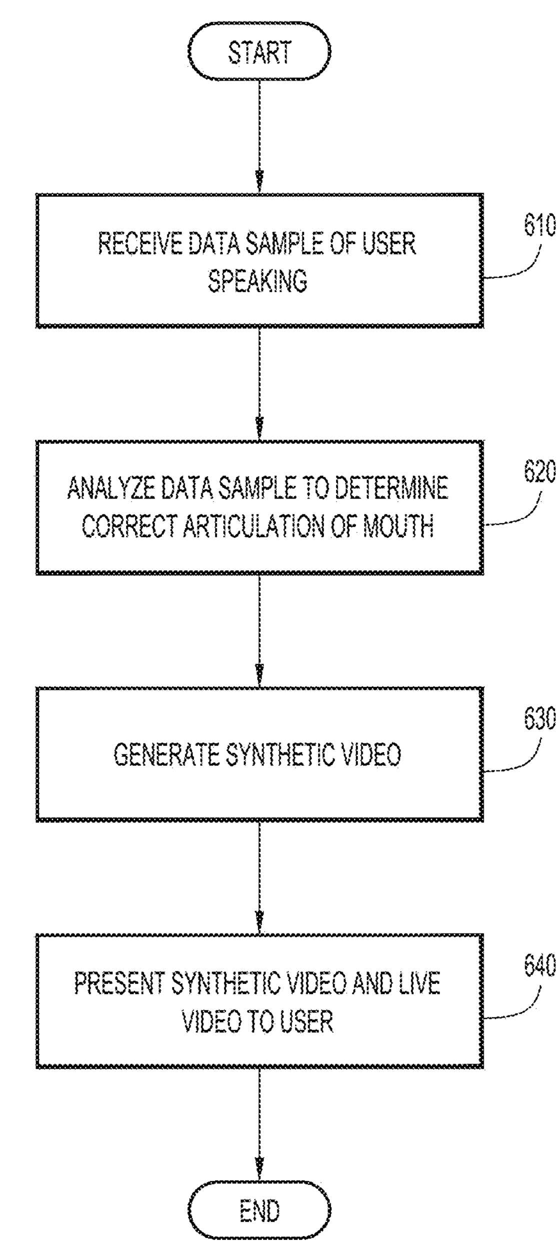
FIG. 6 is a flow chart of a method of presenting synthetic video to a user to improve speech, according to an example embodiment.

FIG. 6 is a flow chart of a method 600 of presenting synthetic video to a user to improve speech, according to an example embodiment.

A data sample of a user speaking is received at operation 610. The data sample may include audio data, video data, or both. The data sample may additionally be labeled with, or otherwise associated with, a word or words that the user is speaking.

The data sample is analyzed to determine correct articulations of the mouth at operation 620. Initially, the word or words in the data sample may be converted into individual phonemes via phoneme segmentation. Once the individual phonemes are identified, an articulation is selected for each phoneme, which may include data corresponding to a two-dimensional or three-dimensional model of a mouth making the articulation. Additionally, audio data and/or video data of the user may be analyzed to obtain values for any tone, volume, and/or cadence parameters.

A synthetic video of the correct articulations is generated at operation 630. Using the articulations determined for each phoneme, a video is generated using a machine learning model that may illustrate an individual, such as the user, performing the correct articulations. In some embodiments, the model for each articulation is combined with user image data to generate a synthetic video that has the appearance of the user.

The synthetic video is presented to the user along with a live video of the user at operation 640. Live video of the user may be obtained and presented alongside the synthetic video so that the user can compare his or her articulations to the correct articulations in real time. In some embodiments, the live video is aligned with and overlaid over the synthetic video, or the synthetic video is aligned with and overlaid over the live video, and one layer is made transparent, enabling a user to be able to form the correct articulation by moving their mouth and/or tongue to make the articulation in the live video align with the synthetic video. Accordingly, a user may learn to make the correct articulations when speaking words without relying on a sense of hearing. During presentation of the video, the user may also be presented with text-based feedback, which can include a tone adjustment, a volume adjustment, and/or a cadence adjustment.

Figure 7:
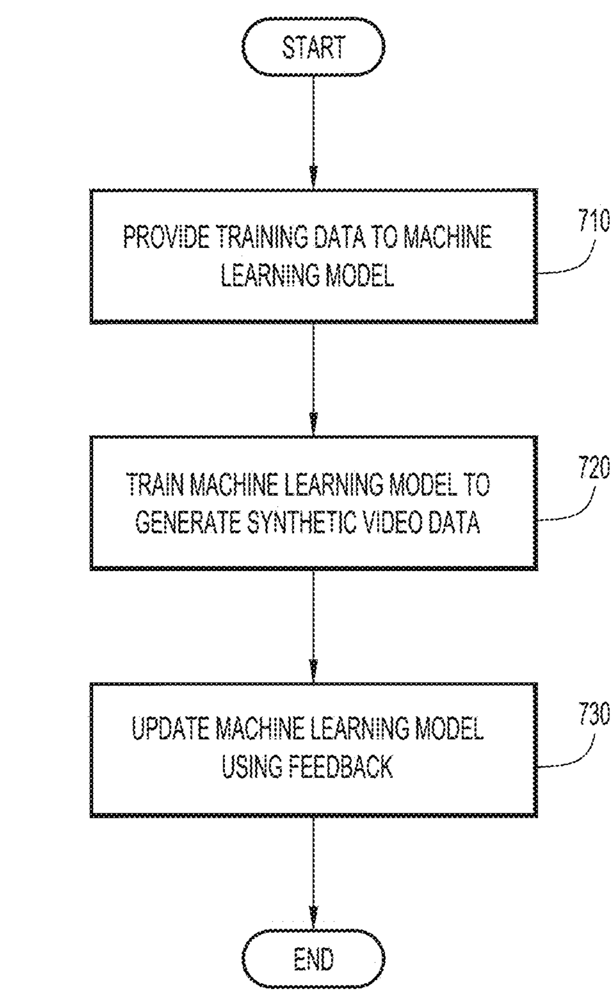
FIG. 7 is a flow chart of a method of training and updating a machine learning model used in the presented techniques, according to an example embodiment.

FIG. 7 is a flow chart of a method 700 of training and updating a machine learning model, according to an example embodiment.

Training data is provided to the machine learning model at operation 710. The training data may include a set of recommendations to improve speech of particular words that are associated with corresponding examples of humans attempting to pronounce the phonemes associated with each word. Each recommendation may include one or more instructions to adjust the mouth in a different manner, such as opening the mouth more, closing the mouth more, and the like.

The machine learning model is trained to generate synthetic video data at operation 720. Using the example recommendations in the training data, the machine learning model can learn which recommendations are associated with particular incorrect articulations. Thus, a resulting trained model can receive as input an articulation image, and as output, can generate one or more recommendations.

The machine learning model is updated using feedback at operation 730. The feedback to update the machine learning model can be obtained based on the outcomes of users who are provided with recommendations of the model. The user or another individual (e.g., an audiologist) can indicate whether each recommendation was helpful or not helpful. Then, the machine learning model can be updated through additional training to increase the up-rank the helpful recommendations and to down-rank the unhelpful recommendations. Accordingly, the machine learning model may be improved over time, thereby increasing the accuracy of the model and improving user outcomes while decreasing the amount of time users must spend learning or improving speech.

Figure 8:
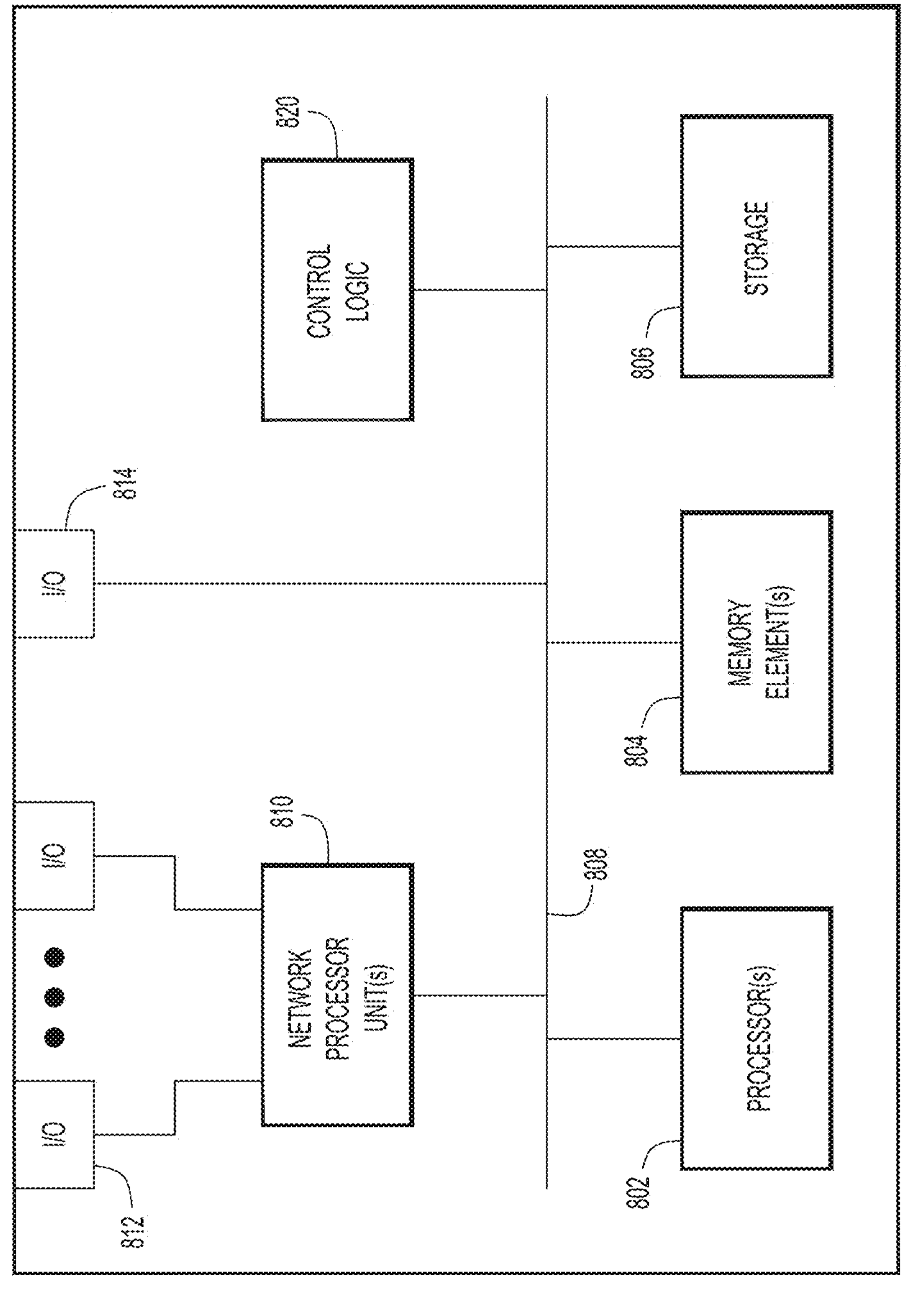
FIG. 8 is a block diagram of a device that may be configured to provide speech feedback, as presented herein.

Referring now to FIG. 8, a block diagram is shown of a computing device 800 that may perform functions associated with the techniques discussed herein in connection with FIGS. 1-7.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O 814, and 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O 814 allow for input and output of data and/or information with other entities that may be connected to computing device 800. For example, I/O 814 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In some aspects, the techniques described herein relate to a computer-implemented method including: receiving a data sample of a user speaking one or more words, wherein the data sample includes video data and audio data of the user speaking; analyzing the data sample to determine a correct articulation of a mouth when speaking the one or more words; generating a synthetic video of the user performing the correct articulation; presenting the synthetic video of the user to the user; and presenting a live video of the user to the user while the synthetic video is presented.

In some aspects, the techniques described herein relate to a computer-implemented method, wherein generating the synthetic video of the user includes processing one or more images of the user using a trained machine learning model.

In some aspects, the techniques described herein relate to a computer-implemented method, wherein presenting the live video includes displaying the live video in a first layer that superimposes a second layer in which the synthetic video is displayed, and wherein the first layer is transparent.

In some aspects, the techniques described herein relate to a computer-implemented method, further including identifying, using a natural language processing model, the one or more words that the user is speaking, and wherein the identified one or more words are used to generate the synthetic video.

In some aspects, the techniques described herein relate to a computer-implemented method, further including presenting a visual articulation prompt when presenting the live video of the user.

In some aspects, the techniques described herein relate to a computer-implemented method, wherein analyzing the data sample further includes determining one or more feedback instructions for the user, the one or more feedback instructions including one or more of: a tone adjustment, a volume adjustment, and a cadence adjustment, and wherein the computer-implemented method further includes: presenting the one or more feedback instructions to the user.

In some aspects, the techniques described herein relate to a computer-implemented method, wherein the one or more feedback instructions are presented using an augmented reality display.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: receive a data sample of a user speaking one or more words, wherein the data sample includes video data and audio data of the user speaking; analyze the data sample to determine a correct articulation of a mouth when speaking the one or more words; generate a synthetic video of the user performing the correct articulation; present the synthetic video of the user to the user; and present a live video of the user to the user while the synthetic video is presented.

In some aspects, the techniques described herein relate to a computer system, wherein the instructions to generate the synthetic video of the user include instructions for processing one or more images of the user using a trained machine learning model.

In some aspects, the techniques described herein relate to a computer system, wherein the instructions to present the live video include instructions to display the live video in a first layer that superimposes a second layer in which the synthetic video is displayed, and wherein the first layer is transparent.

In some aspects, the techniques described herein relate to a computer system, further including instructions to identify, using a natural language processing model, the one or more words that the user is speaking, and wherein the identified one or more words are used to generate the synthetic video.

In some aspects, the techniques described herein relate to a computer system, further including instructions to present a visual articulation prompt when presenting the live video of the user.

In some aspects, the techniques described herein relate to a computer system, wherein the instructions to analyze the data sample further include instructions to determine one or more feedback instructions for the user, the one or more feedback instructions including one or more of: a tone adjustment, a volume adjustment, and a cadence adjustment, and wherein the instructions further include: presenting the one or more feedback instructions to the user.

In some aspects, the techniques described herein relate to a computer system, wherein the one or more feedback instructions are presented using an augmented reality display.

In some aspects, the techniques described herein relate to a computer program product including one or more computer readable storage media collectively having program instructions embodied therewith, the program instructions executable by a computer to cause the computer to: receive a data sample of a user speaking one or more words, wherein the data sample includes video data and audio data of the user speaking; analyze the data sample to determine a correct articulation of a mouth when speaking the one or more words; generate a synthetic video of the user performing the correct articulation; present the synthetic video of the user to the user; and present a live video of the user to the user while the synthetic video is presented.

In some aspects, the techniques described herein relate to a computer program product, wherein the instructions to generate the synthetic video of the user cause the computer to process one or more images of the user using a trained machine learning model.

In some aspects, the techniques described herein relate to a computer program product, wherein the instructions to present the live video cause the computer to display the live video in a first layer that superimposes a second layer in which the synthetic video is displayed, and wherein the first layer is transparent.

In some aspects, the techniques described herein relate to a computer program product, further including instructions to cause the computer to identify, using a natural language processing model, the one or more words that the user is speaking, and wherein the identified one or more words are used to generate the synthetic video.

In some aspects, the techniques described herein relate to a computer program product, further including instructions to cause the computer to present a visual articulation prompt when presenting the live video of the user.

In some aspects, the techniques described herein relate to a computer program product, wherein the instructions to analyze the data sample further cause the computer to determine one or more feedback instructions for the user, the one or more feedback instructions including one or more of: a tone adjustment, a volume adjustment, and a cadence adjustment, and wherein the instructions further cause the computer to: present the one or more feedback instructions to the user.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

receiving a data sample of a user speaking one or more words, wherein the data sample includes video data and audio data of the user speaking;

analyzing the data sample to determine a correct articulation of a mouth when speaking the one or more words;

analyzing the data sample to detect a tone, a volume, or a cadence of speech of the user;

determining one or more feedback instructions based on one or more conditional rules related to the tone, the volume, or the cadence;

determining at least one additional feedback instruction to correct a mouth articulation of the user, wherein the at least one additional feedback instruction is generated by a machine learning model that is trained based on one or more example feedback instructions and corresponding one or more samples of incorrect articulations;

generating a synthetic video of the user performing the correct articulation;

presenting the synthetic video of the user to the user; and presenting the one or more feedback instructions, the at least one additional feedback instruction, and a live video of the user to the user while the synthetic video is presented, wherein the mouth articulation of the user in the live video is arranged to superimpose the correct articulation in the synthetic video.

2. The computer-implemented method of claim 1, wherein presenting the live video comprises displaying the live video in a first layer that superimposes a second layer in which the synthetic video is displayed, and wherein the first layer is transparent.

3. The computer-implemented method of claim 1, further comprising identifying, using a natural language processing model, the one or more words that the user is speaking, and wherein the one or more words are used to generate the synthetic video.

4. The computer-implemented method of claim 1, further comprising presenting a visual articulation prompt when presenting the live video of the user.

5. The computer-implemented method of claim 1, wherein the one or more feedback instructions include one or more of: a tone adjustment, a volume adjustment, and a cadence adjustment, and wherein the one or more conditional rules include one or more of:

identifying the tone adjustment based on a determination of whether a tone parameter related to the tone violates a first threshold value, identifying the volume adjustment based on a determination of whether a volume parameter related to the volume violates a second threshold value, and identifying the cadence adjustment based on a determination of whether a cadence parameter related to the cadence violates a third threshold value.

6. The computer-implemented method of claim 5, wherein the one or more feedback instructions are presented using an augmented reality display while the user is engaging in a conversation.

7. A computer system comprising:

one or more computer processors;

one or more computer readable storage media; and program instructions stored on the one or more computer readable storage media for execution by at least one of the one or more computer processors, the program instructions comprising instructions to:

receive a data sample of a user speaking one or more words, wherein the data sample includes video data and audio data of the user speaking;

analyze the data sample to determine a correct articulation of a mouth when speaking the one or more words;

analyze the data sample to detect a tone, a volume, or a cadence of speech of the user;

determine one or more feedback instructions based on one or more conditional rules related to the tone, the volume, or the cadence;

determine at least one additional feedback instruction to correct a mouth articulation of the user, wherein the at least one additional feedback instruction is generated by a machine learning model that is trained based on one or more example feedback instructions and corresponding one or more samples of incorrect articulations;

generate a synthetic video of the user performing the correct articulation;

present the synthetic video of the user to the user; and present the one or more feedback instructions, the at least one additional feedback instruction, and a live video of the user to the user while the synthetic video is presented, wherein the mouth articulation of the user in the live video is arranged to superimpose the correct articulation in the synthetic video.

8. The computer system of claim 7, wherein the instructions to present the live video comprise instructions to display the live video in a first layer that superimposes a second layer in which the synthetic video is displayed, and wherein the first layer is transparent.

9. The computer system of claim 7, further comprising instructions to identify, using a natural language processing model, the one or more words that the user is speaking, and wherein the one or more words are used to generate the synthetic video.

10. The computer system of claim 7, further comprising instructions to present a visual articulation prompt when presenting the live video of the user.

11. The computer system of claim 7, wherein the one or more feedback instructions include one or more of: a tone adjustment, a volume adjustment, and a cadence adjustment, and wherein the one or more conditional rules include one or more of:

identifying the tone adjustment based on a determination of whether a tone parameter related to the tone violates a first threshold value, identifying the volume adjustment based on a determination of whether a volume parameter related to the volume violates a second threshold value, and identifying the cadence adjustment based on a determination of whether a cadence parameter related to the cadence violates a third threshold value.

12. The computer system of claim 11, wherein the one or more feedback instructions are presented using an augmented reality display while the user is engaging in a conversation.

13. A non-transitory computer program product comprising one or more computer readable storage media collectively having program instructions embodied therewith, the program instructions executable by a computer to cause the computer to:

receive a data sample of a user speaking one or more words, wherein the data sample includes video data and audio data of the user speaking;

analyze the data sample to determine a correct articulation of a mouth when speaking the one or more words;

analyze the data sample to detect a tone, a volume, or a cadence of speech of the user;

determine one or more feedback instructions based on one or more conditional rules related to the tone, the volume, or the cadence;

determine at least one additional feedback instruction to correct a mouth articulation of the user, wherein the at least one additional feedback instruction is generated by a machine learning model that is trained based on one or more example feedback instructions and corresponding one or more samples of incorrect articulations;

generate a synthetic video of the user performing the correct articulation;

present the synthetic video of the user to the user; and present the one or more feedback instructions, the at least one additional feedback instruction, and a live video of the user to the user while the synthetic video is presented, wherein the mouth articulation of the user in the live video is arranged to superimpose the correct articulation in the synthetic video.

14. The non-transitory computer program product of claim 13, wherein the program instructions to present the live video cause the computer to display the live video in a first layer that superimposes a second layer in which the synthetic video is displayed, and wherein the first layer is transparent.

15. The non-transitory computer program product of claim 13, further comprising program instructions to cause the computer to identify, using a natural language processing model, the one or more words that the user is speaking, and wherein the one or more words are used to generate the synthetic video.

16. The non-transitory computer program product of claim 13, further comprising program instructions to cause the computer to present a visual articulation prompt when presenting the live video of the user.

17. The non-transitory computer program product of claim 13, wherein the one or more feedback instructions include one or more of: a tone adjustment, a volume adjustment, and a cadence adjustment, and wherein the one or more conditional rules include one or more of:

identifying the tone adjustment based on a determination of whether a tone parameter related to the tone violates a first threshold value, identifying the volume adjustment based on a determination of whether a volume parameter related to the volume violates a second threshold value, and identifying the cadence adjustment based on a determination of whether a cadence parameter related to the cadence violates a third threshold value.

18. The computer-implemented method of claim 1, wherein the at least one additional feedback instruction includes one or more adjustments to a mouth shape of the user.

19. The computer-implemented method of claim 1, wherein the one or more example feedback instructions include one or more recommendations to adjust a mouth shape.

20. The computer-implemented method of claim 1, wherein the at least one additional feedback instruction includes at least one text-based feedback instruction indicating an adjustment to the tone of speech of the user.

* * * * *